United States Patent
Kojima et al.

(10) Patent No.: US 7,464,799 B2
(45) Date of Patent: Dec. 16, 2008

(54) HYDRAULIC EQUIPMENT WITH BUILT-IN FREE PISTON

(75) Inventors: Shigeru Kojima, Tokyo (JP); Tomohiko Baba, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 11/346,563

(22) Filed: Feb. 3, 2006

(65) Prior Publication Data
US 2006/0180418 A1 Aug. 17, 2006

(30) Foreign Application Priority Data
Feb. 16, 2005 (JP) ................ 2005-38643

(51) Int. Cl.
*F16F 9/52* (2006.01)

(52) U.S. Cl. .................. 188/276; 188/314; 188/322.19

(58) Field of Classification Search .......... 188/276, 188/314, 322.19; 267/64.15; 138/30
See application file for complete search history.

(56) References Cited

U.S. PATENT DOCUMENTS 4,241,816 A * 12/1980 Hubrecht et al. .......... 188/298
4,614,255 A * 9/1986 Morita et al. .......... 188/315

FOREIGN PATENT DOCUMENTS

| DE | 197 24 015 A1 | | 12/1998 |
|---|---|---|---|
| JP | 62-184244 | * | 8/1987 |
| JP | 62-292965 | | 12/1987 |
| JP | 04083903 A | | 3/1992 |
| JP | 2001-1295877 | * | 10/2001 |
| JP | 2004-011864 | | 1/2004 |

* cited by examiner

*Primary Examiner*—Bradley T King
(74) *Attorney, Agent, or Firm*—Rabin & Berdo, PC

(57) ABSTRACT

A gas chamber (G) and a liquid chamber (R) are separated by a free piston (2) in a cylinder (1) of a hydraulic damper. The free piston (2) comprises a hollow main body (3), a metal bellows (4) which elongates and contracts according to a pressure balance between the gas chamber (G) and liquid chamber (R), and a stopper (8) fixed to the main body (3) for preventing the metal bellows (4) from elongating beyond a predetermined length. By compensating for variation in the capacity of the liquid chamber (R) caused by a displacement of the piston (10) in the cylinder (1) by elongation or contraction of the metal bellows (4), the damping characteristic of the damper is prevented from becoming unstable due to a frictional force acting on the free piston (2). The stopper (8) prevents excessive stress from being exerted on the metal bellows (4).

6 Claims, 2 Drawing Sheets

HYDRAULIC EQUIPMENT WITH BUILT-IN FREE PISTON

FIELD OF THE INVENTION

This invention relates to an improvement of hydraulic equipment having a built-in free piston for separating liquid and gas.

BACKGROUND OF THE INVENTION

An accumulator or single tube hydraulic damper has, for example, a free piston which is enclosed in a cylinder or housing so as to be free to slide in order to separate a liquid chamber and a gas chamber.

In an accumulator, temperature variation of the liquid volume in a liquid system is compensated by axial displacement of the free piston in the cylinder so as to increase the capacity of the liquid chamber while decreasing the capacity of the gas chamber, or vice versa.

In a hydraulic damper, variation in the capacity of the liquid chamber due to elongation and contraction of the piston rod is also compensated by the axial displacement of the free piston in the cylinder.

The free piston separating the liquid chamber and gas chamber, is generally provided with a seal member such as an O-ring on its outer circumference. The seal member is arranged to be in contact with the inner circumference of the cylinder under a predetermined contact pressure.

When the free piston axially slides in the cylinder, friction occurs between the seal member and the inner circumference of the cylinder, and the free piston does not start to slide until the differential pressure between the liquid chamber and the gas chamber surpasses the frictional resistance between the seal member and the inner circumference of the cylinder. This operation characteristic of a free piston may bring about an unfavorable effect on the response and reliability of hydraulic equipment that has a built-in free piston. In a hydraulic damper, specifically, this characteristic of a free piston may render the damping characteristic unstable.

SUMMARY OF THE INVENTION

In order to solve the above problem arising in a hydraulic device with a built-in free piston, JP2004-011864A published by the Japan Patent Office in 2004 proposes a hollow free piston covered by a bladder.

According to this prior art, even if frictional resistance between the free piston and the inner circumference of the cylinder prevents the free piston from sliding, since the bladder expands or shrinks without delay, the variation in the capacity of the liquid chamber can be compensated with good responsiveness.

Rubber having high elasticity is used for the material of the bladder. Rubber is known to permeate gasses little by little, and therefore it is possible to the gas in the gas chamber to infiltrate the liquid chamber over a long period.

It is therefore an object of this invention to solve the response problem inherent in a free piston while preventing gas permeation from the gas chamber to the liquid chamber.

In order to achieve the above object, this invention provides a hydraulic device comprising a cylindrical housing, and a free piston accommodated in the housing so as to be free to slide axially. The free piston separates a gas chamber from a liquid chamber and comprises a metal bellows which elongates and contracts according to a pressure balance between the gas chamber and the liquid chamber to vary a ratio of a capacity of the gas chamber and a capacity of the liquid chamber, and a stopper which prevents the metal bellows from elongating beyond a predetermined length.

The details as well as other features and advantages of this invention are set forth in the remainder of the specification and are shown in the accompanying drawings.

DESCRIPTION OF THE PREFERRED EMBODIMENTS

Figure 1:
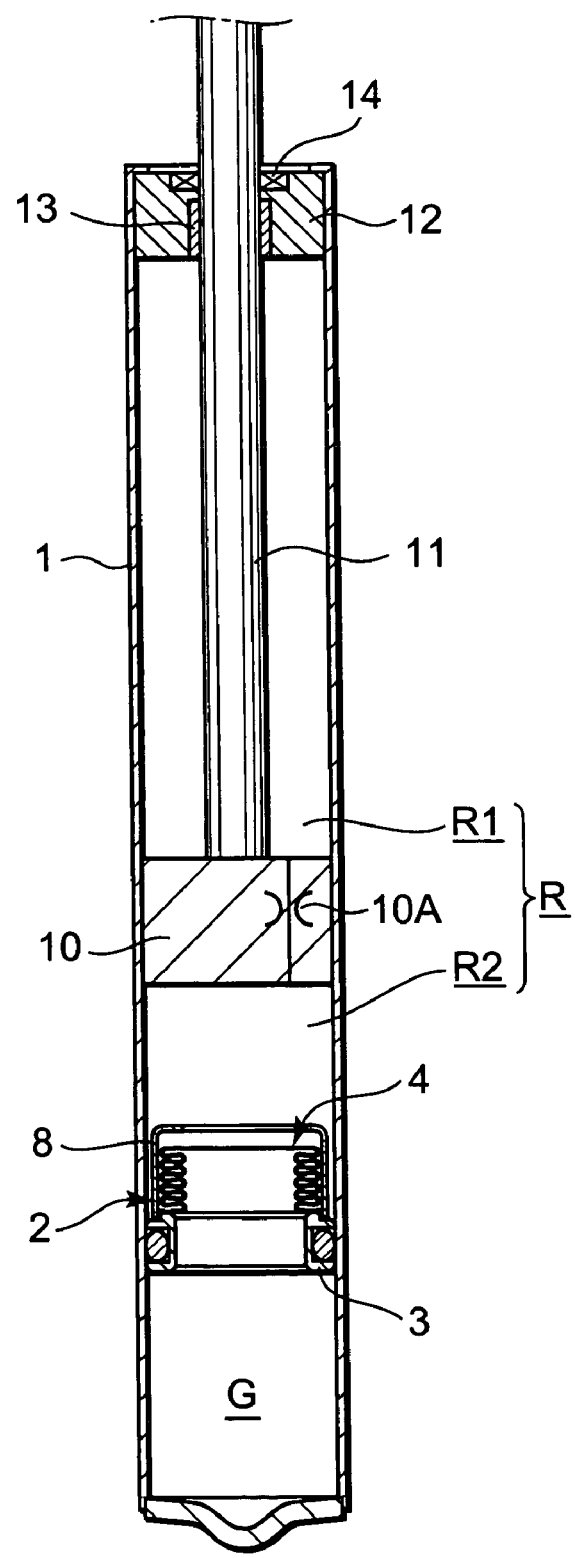
FIG. 1 is a longitudinal sectional view of a hydraulic damper according to this invention.

Referring to FIG. 1 of the drawings, a hydraulic damper comprises a cylinder 1 which constitutes a housing, a free piston 2 which is accommodated in the cylinder 1, a piston 10 which is accommodated in the cylinder 1 above the free piston 2, and a piston rod 11 which is fixed to the piston 10 and projects upward from the cylinder 1. The free piston 2 and the piston 10 are respectively supported so as to be free to slide axially on the inner circumference of the cylinder 1.

A rod guide 12 is fixed to an upper end of the cylinder 1. The rod guide 12 guides the piston rod 11 in an axial direction while closing the cylinder 1. A bearing 13 for supporting the piston rod 11 and a seal member 14 which is in contact with the piston rod 11 are provided in the rod guide 12. The piston rod 11 is prevented from wobbling with respect to the cylinder 1 by the rod guide 12 and the piston 10.

The space in the cylinder 1 is divided by the free piston 2 into a lower gas chamber G and an upper liquid chamber R. The liquid chamber R is further divided by the piston 10 into a lower first operation chamber R1 and an upper second operation chamber R2. The inside of the first operation chamber R1 and the second operation chamber R2 is filled with working oil. The piston is provided with an orifice 10A which causes the first and second operation chambers R1, R2 to communicate with each other. The orifice 10A exerts pressure loss on the oil flow between the first and second operation chambers R1, R2. Instead of providing an orifice, it is possible to provide any damping mechanism that exerts a similar effect, e.g. a relief valve.

Figure 2:
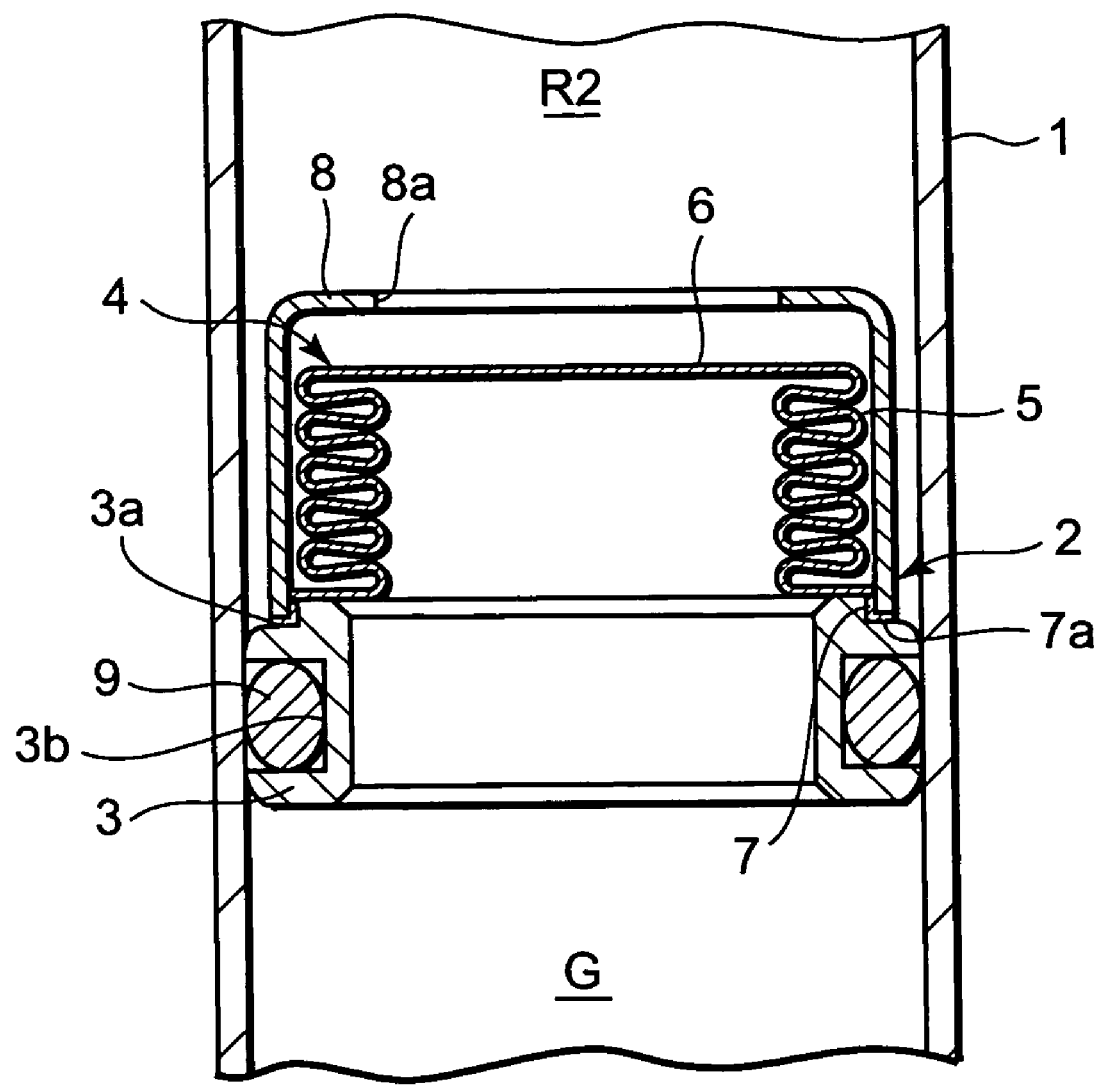
FIG. 2 is a longitudinal sectional view of a free piston according to this invention.

Referring to FIG. 2, the free piston 2 comprises a hollow main body 3 which slides on the inner circumference of the cylinder 1, a metal bellows 4 fitted to the upper end of the main body 3 so as to cover the hollow portion of the main body 3, and a stopper 8 which limits elongation of the metal bellows 4 beyond a predetermined length. The piston 10 separates a first liquid chamber, that is the first operation chamber R1, around the piston rod 11, from a second liquid chamber that is the second operation chamber R2 located on the opposite side of the piston rod 11 in the cylinder or housing 1, and the free piston 2 separates the gas chamber G axially from the second liquid chamber R2 in the cylinder or housing 1.

The upper end of the main body 3 has reduced diameter and constitutes a step 3a.

The metal bellows 4 comprises an elongation/contraction part 5, an apex 6 fitted to the top of the elongation/contraction part 5 and a base part 7 which is formed continuously with the lower end of the elongation/contraction part 5. The base part 7 is fitted onto the outer circumference of the step 3a.

The stopper 8 takes the shape of a cap, which covers the metal bellows 4. The base of the stopper 8 is fitted onto the outer circumference of the base part 7 of the metal bellows 4. The base part 7 and the base of the stopper 8 are both fixed to the step 3a by means of welding or the like.

In order to firmly secure the metal bellow 4 to the main body 3, the base part 7 preferably has a flange 7a which is gripped by the stopper 8 and the step 3a. The flange 7a helps in preventing the metal bellows 4 from dropping off the main body 3, but as long as the base part 7 can be secured firmly between the inner circumference of the stopper 8 and the inner circumference of the step 3a so as not to drop off the main body 3, the flange 7a may be omitted. It is also possible to fix the base part 7 and the stopper 8 to the step 3a by means of press fitting instead of welding. By welding, however, the gas chamber G and the liquid chamber R are separated more completely, and the gas and liquid can be separated more reliably.

A communicating hole 8a is formed in the center of the upper end surface of the stopper 8 such that the inner space and the outer space of the stopper 8 communicates with each other. The diameter of the communicating hole 8a is set to be smaller than that of the metal bellows 4 such that the communicating hole 8a is closed by the apex 6 when the metal bellows 4 fully elongates. It is also possible to provide a plurality of holes on the upper end surface of the stopper 8 instead of the single communicating hole 8a.

An annular groove 3b is formed on the outer circumference of the main body 3 of the free piston 2. An O-ring 9 which slides on the inner circumference of the cylinder 1 is fitted into the annular groove 3b.

According to the above construction, the second operation chamber R2 and the gas chamber G are separated by the metal bellows 4. Since the metal bellows 4 does not allow gasses to permeate, the second operation chamber R2 and the gas chamber G are completely isolated from each other over a long period of time. Also the metal bellows 4 fixed to the main body 3 by means of welding maintains a high degree of airtightness under a wide variation of temperature or high pressure. As a result, the hydraulic damper can be designed to generate a high damping force. Since all the members of the free piston 2 except the O-ring 9 are made of metal and fitting of the members to the main body 3 can be performed more easily than in the prior art, where the bladder is secured onto the free piston, the free piston 2 is easy to build and its manufacturing cost is also low.

The difference in the capacity of the metal bellows 4 in its most elongated state where the stopper 8 prevents further elongation thereof and in its most contracted state is used prior to the displacement of the free piston 2 to compensate for variation in the capacity of the liquid chamber R. This difference in capacity is previously set to be equal to or greater than the maximum penetration volume of the piston rod 11 into the cylinder 1.

As the hydraulic damper elongates and contracts, the piston 10 displaces in the cylinder 1, the working oil moving between the first operating chamber R1 and the second operating chamber R2 through the orifice 10A suffers a pressure loss, and a damping force corresponding to the pressure loss is generated in the damper.

As the hydraulic damper elongates or contracts, the piston rod 11 projects from the cylinder 1 or penetrates into the cylinder 1 and causes the capacity of the liquid chamber R to vary. This variation in capacity is mainly compensated by the elongation/contraction of the metal bellows 4.

When the free piston 2 displaces in the cylinder 1, a friction force acts between the O-ring 9 and the inner circumference of the cylinder 1 in a direction opposite to the displacement of the free piston 2. Accordingly, as long as the differential pressure acting on the free piston 2 is smaller than the friction force, the free piston 2 does not move.

In contrast, the elongation/contraction part 5 of the metal bellows 4 deforms quickly in response to minute variation in the pressure balance between the second operating chamber R2 and the gas chamber G. This deformation results in the displacement of the apex 6 which is the border between the two chambers R2, G. As a result, the capacities of the two chambers R2, G vary smoothly without delay so that the pressures in these chambers balance again, even if the free piston 2 is prevented from displacing due to the friction force acting between the O-ring 9 and the inner circumference of the cylinder 1. This characteristic brings about a favorable effect on the damping performance for damping minute oscillations of the hydraulic damper. The metal bellows 4 also compensates for the variation in the pressures in these chambers in accordance with the variation in temperature.

As described hereintofore, the difference in the capacity of the metal bellows 4 between its most elongated state and its most contracted state is set equal to or greater than the maximum penetration volume of the piston rod 11 into the cylinder 1, and hence the variation in the capacity of the liquid chamber R due to displacement of the piston 10 is basically compensated by the elongation or contraction of the metal bellows 4. As a result the O-ring 9 of the free piston does not frequently slide on the inner circumference of the cylinder, and hence mixing of gas and liquid due to sliding of the O-ring 9 is prevented.

However, when the hydraulic damper elongates to the maximum elongation position, the elongating metal bellows 4 may come into contact with the stopper 8 depending on the temperature condition. In this case, the free piston 2 can displace upward in the figure to balance the pressures in the gas chamber G and liquid chamber R. When a large tension is exerted on the elongation/contraction part 5 of the metal bellows 4 due to elongation of the metal bellows 4, a crack may form in the elongation/contraction part 5. In this hydraulic damper, since the stopper 8 prevents the metal bellows 4 from elongating beyond the predetermined distance, damage to the elongation/contraction part 5 is prevented and the durability and reliability of the hydraulic damper are ensured.

When the metal bellows 4 comes into contact with the stopper 8, the apex 6 closes the communicating hole 8a. Immediately before the metal bellows 4 comes into contact with the stopper 8, the communicating hole 8a, the cross-sectional flow area of which is narrowed by the approaching apex 6 functions as an orifice with respect to the liquid flow through the communicating hole 8a from the inside of the stopper 8 to the outside thereof.

This phenomenon generates a damping force which acts against the elongation of the metal bellows 4. This damping force prevents a collision between the metal bellows 4 and the stopper 8, and increases the durability and reliability of the hydraulic damper.

When the hydraulic damper contracts to the contracting limit, the metal bellows 4 also contracts to a great extent. In certain cases where the contraction of the metal bellows 4 may not be able to maintain the pressure balance of the gas chamber G and the liquid chamber R depending on the temperature condition. In such cases, the free piston 2 can displace downward such that the pressures in the two chambers G, R balance.

By disposing the metal bellows 4 above the main body 3 or on the liquid chamber side of the main body 3, a larger capacity can be ensured in the gas chamber G than in a case where the metal bellows 4 is disposed under the main body 3 or on the gas chamber side of the main body 3. In other words, in the former case, the displacement position of the free piston 2 is lower than in the latter case for an identical capacity of the gas chamber G, and hence, according to the former case, the effective stroke of the piston 10 is longer and the whole length of the hydraulic damper can be shorter than in the latter case. It should be noted, however, that disposing the metal bellows above the main body 3 is not an indispensable feature of the present invention. Even in the case where it is disposed under the main body 3, variation in the capacity of the liquid chamber R is compensated with good responsiveness according to this invention.

The contents of Tokugan 2005-038643, with a filing date of Feb. 16, 2005 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiment, the metal bellows 4 is designed to have a capacity which can compensate for variation in the capacity of the liquid chamber R corresponding to the maximum penetrating volume of the piston rod 11 into the cylinder 1. It is however possible to set the capacity of the metal bellows 4 to be smaller such that only a variation in the capacity of the liquid chamber R due to a small displacement of the piston 10 is compensated by elongation or contraction of the metal bellows 4, and with respect to a larger displacement of the piston 10, the variation in the capacity of the liquid chamber R is compensated by the displacement of the free piston 2. In this case also, a favorable effect of absorbing minute oscillations is obtained while using a metal bellows of a small capacity.

In the above embodiment, this invention is applied to a single-tube hydraulic damper, but this invention can be applied to any hydraulic device provided with a free piston for separating gas and liquid, such as an accumulator.

The embodiments of this invention in which an exclusive property or privilege is claimed are defined as follows:

What is claimed is:

1. A hydraulic device, comprising:
    a cylindrical housing;
    a free piston accommodated in the housing so as to be free to slide axially, the free piston separating a gas chamber axially from a liquid chamber in the housing, the free piston comprising:
        a hollow main body which is in contact with an inner circumference of the housing;
        a metal bellows having an open end which is secured to an end of the main body, and elongating and contracting according to a pressure balance between the gas chamber and the liquid chamber to vary a ratio of a capacity of the gas chamber and a capacity of the liquid chamber; and
        a stopper which prevents the metal bellows from elongating beyond a predetermined length, the stopper comprising a cap shaped member which is fixed to the main body and covers the metal bellows, the cap shaped member having a communicating hole allowing communication between an inside and an outside of the cap shaped member; and
    a hydraulic damper which comprises a piston which reciprocates in the housing and separates the liquid chamber into a first operating chamber and a second operating chamber, and a piston rod which is fixed to the piston and projects through the first operating chamber and outward from the housing, whereby the free piston separates the gas chamber axially from the second operating chamber in the housing.

2. The hydraulic device as defined in claim 1, wherein the main body comprises an O-ring which is in contact with the inner circumference of the housing.

3. The hydraulic device as defined in claim 1, wherein the cap shaped member is configured to prevent the metal bellows from elongating beyond the predetermined length through physical contact with the metal bellows in elongation.

4. The hydraulic device as defined in claim 3, wherein the communicating hole is configured such that a cross-sectional area of the communicating hole decreases as the metal bellows approaches the cap shaped member.

5. The hydraulic device as defined in claim 1, wherein the metal bellows is disposed on a same side as the liquid chamber with respect to the main body.

6. The hydraulic device as defined in claim 1, wherein the metal bellows is configured to have a capacity which can compensate for a difference between a capacity of the liquid chamber in a state where the piston is at a most elongated position and a capacity of the liquid chamber in a state where the piston is at a most contracted position.

* * * * *